(12) United States Patent
Watanabe et al.

(10) Patent No.: US 11,575,161 B2
(45) Date of Patent: Feb. 7, 2023

(54) SECONDARY BATTERY PROTECTION CIRCUIT, SECONDARY BATTERY PROTECTION APPARATUS, BATTERY PACK AND TEMPERATURE DETECTION CIRCUIT

(71) Applicants: Yohei Watanabe, Tokyo (JP); Takashi Takeda, Tokyo (JP); Junji Takeshita, Tokyo (JP); Daisuke Suzuki, Tokyo (JP)

(72) Inventors: Yohei Watanabe, Tokyo (JP); Takashi Takeda, Tokyo (JP); Junji Takeshita, Tokyo (JP); Daisuke Suzuki, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 172 days.

(21) Appl. No.: 17/069,121

(22) Filed: Oct. 13, 2020

(65) Prior Publication Data

US 2021/0119274 A1    Apr. 22, 2021

(30) Foreign Application Priority Data

Oct. 18, 2019   (JP) ............................. JP2019-191307

(51) Int. Cl.
   *H01M 14/00*   (2006.01)
   *H01M 10/44*   (2006.01)
   (Continued)

(52) U.S. Cl.
   CPC ....... *H01M 10/443* (2013.01); *H01M 10/486* (2013.01); *H02J 7/007194* (2020.01);
   (Continued)

(58) Field of Classification Search
   None
   See application file for complete search history.

(56) References Cited

U.S. PATENT DOCUMENTS

| | | | | |
|---|---|---|---|---|
| 5,963,019 A | * | 10/1999 | Cheon | ...................... H02H 7/18 320/134 |
| 2008/0012529 A1 | * | 1/2008 | Chang | ................... H02J 7/0016 320/116 |

(Continued)

FOREIGN PATENT DOCUMENTS

JP       2009-100605       5/2009

*Primary Examiner* — Raymond Alejandro
(74) *Attorney, Agent, or Firm* — Ipusa, PLLC

(57) ABSTRACT

A secondary battery protection circuit for controlling charge and discharge using a switching circuit to protect a secondary battery from temperature is provided. The switching circuit is configured to be provided in a charge-and-discharge path between the secondary battery and an external device. The secondary battery protection circuit includes a detection terminal configured to be electrically connected, via a resistor, to between the switching circuit and the external device. The secondary battery protection circuit includes a first terminal configured to be electrically connected to a temperature detection terminal of the external device. The secondary battery protection circuit includes a second terminal to which a temperature sensitive element is configured to be electrically connected, the temperature sensitive element having a characteristic value varying in accordance with a change in temperature of the secondary battery.

13 Claims, 14 Drawing Sheets

(51) Int. Cl.
  *H02J 7/04* (2006.01)
  *H02J 7/00* (2006.01)
  *H01M 10/48* (2006.01)

(52) U.S. Cl.
  CPC ......... *H02J 7/04* (2013.01); *H01M 2200/105* (2013.01); *H01M 2200/108* (2013.01)

(56) References Cited

U.S. PATENT DOCUMENTS

2014/0225622 A1* 8/2014 Kudo .................. B60L 58/13
                                                    324/433
2017/0334376 A1* 11/2017 Chen .................. H02J 7/1438

* cited by examiner

SECONDARY BATTERY PROTECTION CIRCUIT, SECONDARY BATTERY PROTECTION APPARATUS, BATTERY PACK AND TEMPERATURE DETECTION CIRCUIT

CROSS-REFERENCE TO RELATED APPLICATION

This application claims priority under 35 U.S.C. § 119 to Japanese Patent Application No. 2019-191307, filed Oct. 18, 2019, the contents of which are incorporated herein by reference in their entirety.

BACKGROUND

1. Technical Field

The present disclosure relates to a secondary battery protection circuit, a secondary battery protection apparatus, a battery pack, and a temperature detection circuit.

2. Description of the Related Art

Techniques are known in which a negative temperature coefficient (NTC) thermistor is provided in a battery pack, and the battery pack outputs a signal to an external device such as a charger connected to the battery pack. The external device protects the battery pack from temperature (see, for example, FIG. 2 of Japanese Unexamined Patent Application No. 2009-100605 that is hereinafter referred to as Patent document 1). Since a resistance value for the NTC thermistor decreases at high temperature, in a case where the resistance value for the NTC thermistor decreases to a certain extent and the external device determines that a temperature of the battery pack meets or exceeds a predetermined temperature, the external device provides temperature protection to cut off current in order to disable charging of the battery pack, or the like.

In contrast, when the external device does not have a temperature protection function, techniques are known in which the NTC thermistor is provided in the battery pack, and the battery pack itself protects against temperature (see, for example, FIG. 1 of Patent document 1). When the resistance value for the NTC thermistor decreases to a certain extent, a protection IC in the battery pack provides temperature protection to turn a charge control FET off in order to disable the charging of the battery pack.

The present disclosure provides a secondary battery protection circuit, a secondary battery protection apparatus, a battery pack, and a temperature detection circuit whereby a temperature sensitive element is shared between a temperature detection function in an external device and a temperature detection function in a secondary battery circuit.

SUMMARY

A first aspect of the present disclosure relates to a secondary battery protection circuit for controlling charge and discharge using a switching circuit to protect a secondary battery from temperature, the switching circuit configured to be provided in a charge-and-discharge path between the secondary battery and an external device. The secondary battery protection circuit includes:

a detection terminal configured to be electrically connected, via a resistor, to between the switching circuit and the external device;

a first terminal configured to be electrically connected to a temperature detection terminal of the external device;

a second terminal to which a temperature sensitive element is configured to be electrically connected, the temperature sensitive element having a characteristic value varying in accordance with a change in temperature of the secondary battery;

a conversion circuit configured to convert the characteristic value into a voltage corresponding to the change in the temperature of the secondary battery, the conversion circuit being configured to output the voltage;

a comparison circuit configured to compare the output voltage of the conversion circuit with a threshold voltage and output a compared result; and a control circuit configured to control the switching circuit based on the output of the comparison circuit, wherein the conversion circuit includes a first switch provided between the first terminal and the second terminal, and includes a second switch provided between the comparison circuit and the second terminal, and wherein the first switch and the second switch are configured to be controlled by the control circuit.

A second aspect of the present disclosure relates to a secondary battery protection apparatus. The secondary battery protection apparatus includes:

a temperature sensitive element, the temperature sensitive element having a characteristic value varying in accordance with to a change in temperature of a secondary battery;

a switching circuit configured to be provided in a charge-and-discharge path between the secondary battery and an external device; and a secondary battery protection circuit configured to control charge and discharge using the switching circuit to protect the secondary battery from temperature, the secondary battery protection circuit including:

a first terminal configured to be electrically connected to a temperature detection terminal of the external device;

a second terminal to which the temperature sensitive element is electrically connected;

a conversion circuit configured to convert the characteristic value for the temperature sensitive element into a voltage corresponding to the change in the temperature of the secondary battery, the conversion circuit being configured to output the voltage;

a comparison circuit configured to compare the output voltage of the conversion circuit with a threshold voltage and output a compared result and output a compared result; and a control circuit configured to control the switching circuit based on the output of the comparison circuit-, wherein the conversion circuit includes a first switch provided between the first terminal and the second terminal, and includes a second switch provided between the comparison circuit and the second terminal, and wherein the first switch and the second switch are configured to be controlled by the control circuit.

A third aspect of the present disclosure relates to a battery pack. The battery pack includes:

the secondary battery protection apparatus according to the second aspect of the present disclosure; and the secondary battery.

A fourth aspect of the present disclosure relates to a temperature detection circuit for a secondary battery. The temperature detection circuit includes:

a first terminal configured to be electrically connected to a temperature detection terminal of an external device;

a second terminal to which a temperature sensitive element is configured to be electrically connected, the temperature sensitive element having a characteristic value varying in accordance with a change in temperature of the secondary battery;

a conversion circuit configured to convert the characteristic value into a voltage corresponding to the change in the temperature of the secondary battery, the conversion circuit being configured to output the voltage; and a comparison circuit configured to compare the output voltage of the conversion circuit with a threshold voltage, wherein the conversion circuit includes a first switch provided between the first terminal and the second terminal, and includes a second switch provided between the comparison circuit and the second terminal, and wherein the first switch and the second switch are configured to be selectively turned on.

DETAILED DESCRIPTION

Related art information relevant to the present disclosure recognized by the inventors of this application will be provided below. In the related art described in Patent document 1, when each of the external device such as a charger and a secondary battery circuit such as a secondary battery protection circuit has a temperature detection function, the temperature sensitive element such as an NTC thermistor cannot be shared between the temperature detection function in the external device and the temperature detection function in the secondary battery circuit.

According to the techniques described above, the temperature sensitive element can be shared between the temperature detection function in the external device and the temperature detection function in the secondary battery circuit.

Hereafter, one or more embodiments will be described with reference to the drawings.

Figure 1:
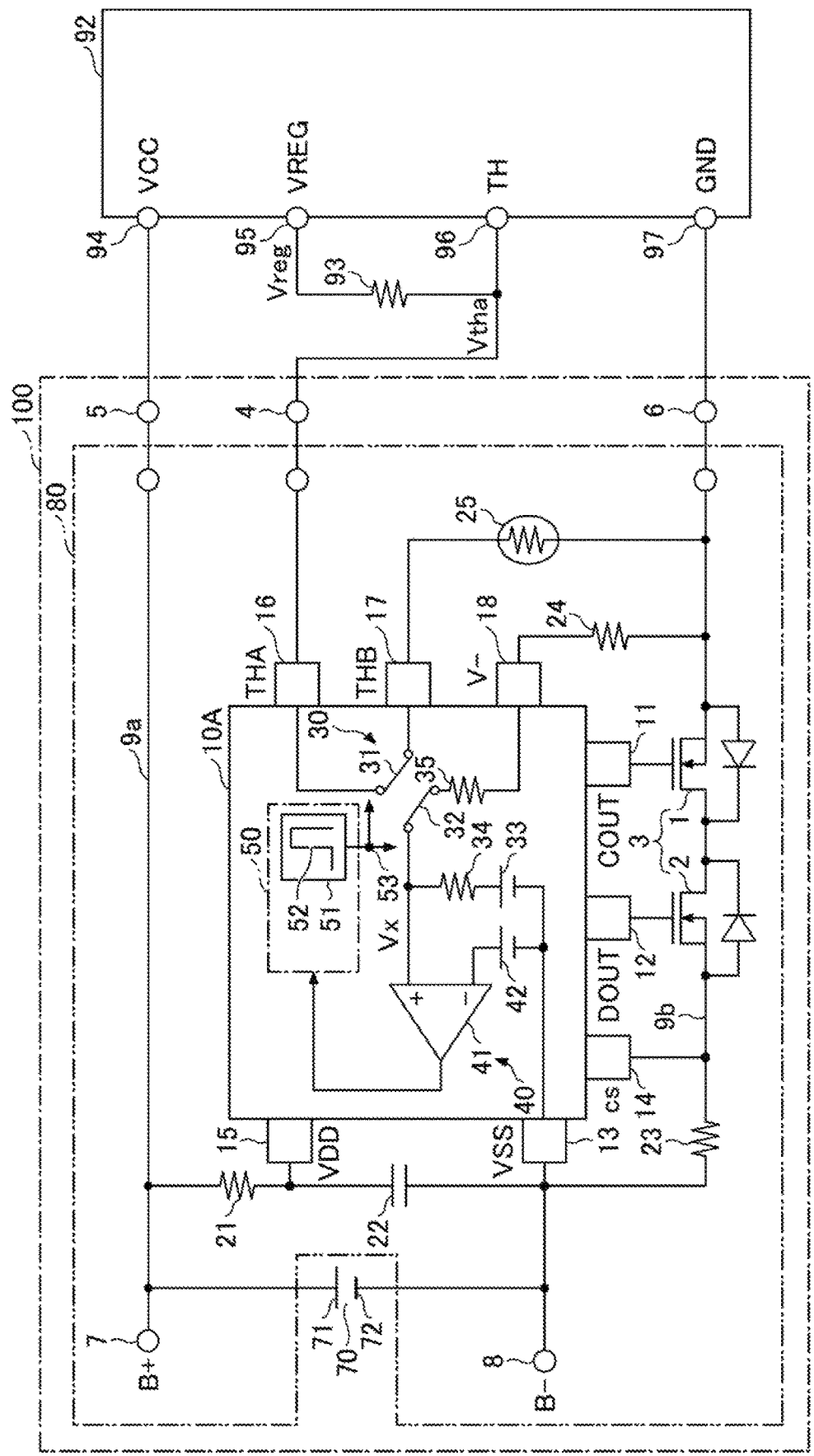
FIG. 1 is a diagram illustrating an example of a first configuration (external device-based temperature protection mode) of a battery pack.
Figure 2:
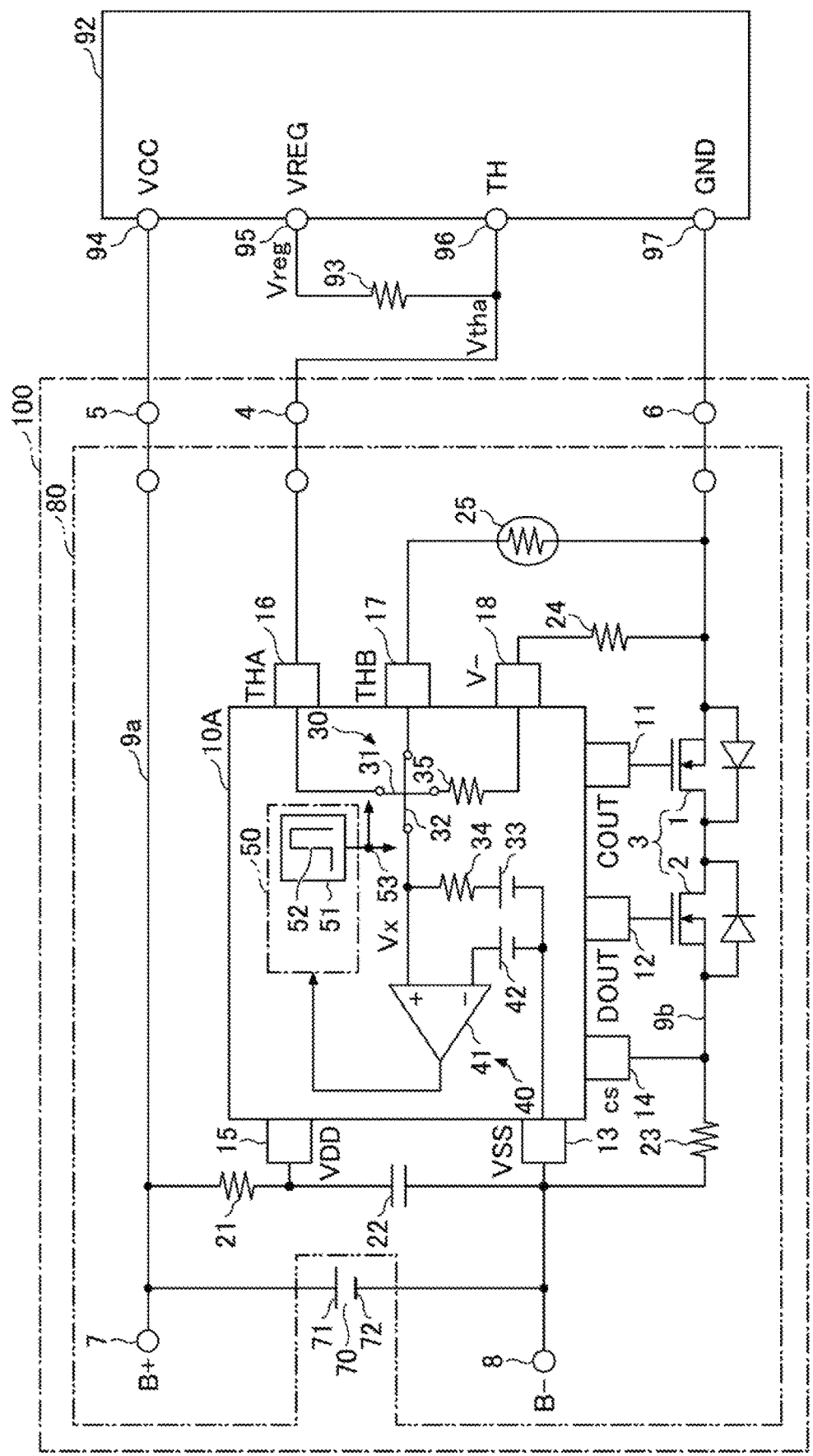
FIG. 2 is a diagram illustrating an example of the first configuration (secondary battery protection circuit-based temperature protection mode) of the battery pack.

FIG. 1 is a diagram illustrating an example of a first configuration (external device-based temperature protection mode) of a battery pack. FIG. 2 is a diagram illustrating an example of the first configuration (secondary battery protection circuit-based temperature protection mode) of the battery pack. The battery pack 100 illustrated in FIGS. 1 and 2 includes a secondary battery 70 and a battery protection apparatus 80.

The secondary battery 70 is an example of a rechargeable battery. The secondary battery 70 supplies power to a load (not illustrated) that is connected to a positive terminal 5 (P+ terminal) and a negative terminal 6 (P− terminal). The secondary battery 70 can be charged by the external device 92 such as a charger that is connected to the positive terminal 5 and the negative terminal 6. Examples of the secondary battery 70 include a lithium ion battery, a lithium polymer battery, and the like. The battery pack 100 may be embedded in the load, or be provided externally.

The external device 92 has a function of protecting the secondary battery 70 from temperature. For example, the external device 92 is a charger that charges the secondary battery 70. The external device 92 may be a load to which power is supplied, by the secondary battery 70, when the external device 92 is a device having the function of protecting the secondary battery 70 from temperature. Temperature protection is also referred to as thermal protection. The temperature protection function will be described below in detail.

The load is a device that is powered by the secondary battery 70 of the battery pack 100, where the secondary battery 70 is used as a power source. Specific examples of the load include a power device such as a power tool and an electronic device such as a portable terminal device. Examples of the electronic device include a mobile phone, a smartphone, a computer, a game device, a television set, a camera, and the like. The load is not limited to the devices described above.

The battery protection apparatus 80 is an example of a secondary battery protection apparatus that operates when powered by the secondary battery 70 as a power source. By controlling the charge and discharge in the secondary battery 70, the battery protection apparatus 80 protects the secondary battery 70 from overcharge, overdischarge, and the like. The battery protection apparatus 80 includes the positive terminal 5 (P+ terminal), the negative terminal 6 (P− terminal), a positive terminal 7 (B+ terminal), and a negative terminal 8 (B− terminal). The battery protection apparatus 80 also includes a monitor terminal 4, a switching circuit 3, and a battery protection circuit 10A.

The positive terminal 5 is an example of a terminal to which a high side power supply terminal 94 (VCC terminal) of the external device 92 is connected. The negative terminal 6 is an example of a terminal to which a low side power supply terminal 97 (GND terminal) of the external device 92 is connected. The positive terminal 7 is a terminal for connecting a positive side current path 9a to a positive electrode 71 of the secondary battery 70. The negative terminal 8 is a terminal for connecting a negative side current path 9b to a negative electrode 72 of the secondary battery 70.

The positive electrode 71 of the secondary battery 70 is connected to the positive terminal 5 via the positive side current path 9a. The negative electrode 72 of the secondary battery 70 is connected to the negative terminal 6 via the negative side current path 9b. The positive side current path 9a is an example of a charge-and-discharge current path between the positive electrode 71 of the secondary battery 70 and the positive terminal 5. The negative side current path 9b is an example of a charge-and-discharge current path between the negative electrode 72 of the secondary battery 70 and the negative terminal 6.

The switching circuit 3 is inserted in the current path 9b, between the negative electrode 72 of the secondary battery 70 and the negative terminal 6 that is connected to the low side power supply terminal 97 of the external device 92.

For example, the switching circuit 3 includes a charge control transistor 1 and a discharge control transistor 2. The charge control transistor 1 is an example of a charge-path interrupting unit that interrupts a charge path associated with the secondary battery 70. The discharge control transistor 2 is an example of a discharge-path interrupting unit that interrupts a discharge path associated with the secondary battery 70. The charge control transistor 1 interrupts the current path 9b along which a charge current flows to the secondary battery 70. The discharge control transistor 2 interrupts the current path 9b along which a discharge current flows out the secondary battery 70. The transistors 1 and 2 are switching elements each of which switches between conduction and interruption of the current path 9b. The transistors 1 and 2 are inserted in the current path 9b. Each of the transistors 1 and 2 is an N-channel metal oxide semiconductor (MOS) transistor, for example.

The battery protection circuit 10A is an example of a secondary battery protection circuit. The battery protection circuit 10A controls the charge and discharge of the secondary battery 70 by using the switching circuit 3 that is provided in the current path 9b that is between the negative electrode 72 of the secondary battery 70 and the GND terminal of the external device 92. Thereby, the battery protection circuit 10A protects the secondary battery 70 from overdischarge, overheat, and the like. The battery protection circuit 10A performs a protection operation for the secondary battery 70, by turning the switching circuit 3 off. The battery protection circuit 10A is an integrated circuit (IC) that operates according to a battery voltage (also referred to as a "cell voltage") across the positive electrode 71 and the negative electrode 72 of the secondary battery 70. For example, the battery protection circuit 10A includes a charge control terminal 11 (COUT terminal), a discharge control terminal 12 (DOUT terminal), a detection terminal 18 (V− terminal), and a power supply terminal 15 (VDD terminal). The battery protection circuit 10A also includes a ground terminal 13 (VSS terminal), a current detection terminal 14 (CS terminal), a first terminal 16 (THA terminal), and a second terminal 17 (THB terminal).

The COUT terminal is connected to a gate of the charge control transistor 1. A signal to turn the charge control transistor 1 on or off is output via the COUT terminal. The DOUT terminal is connected to a gate of the discharge control transistor 2. A signal to turn the discharge control transistor 2 on or off is output via the DOUT terminal.

The V− terminal is used to monitor a potential at the negative terminal 6 and is connected to the negative terminal 6. In this example, the V− terminal is used by a control circuit 50 to detect the presence or absence of connection with the external device 92. The V− terminal is connected, via a resistor 24, to the current path 9b between the switching circuit 3 and the negative terminal 6.

The VDD terminal is a power supply terminal of the battery protection circuit 10A. The VDD terminal is connected to the positive electrode 71 of the secondary battery 70, via the current path 9a. The VSS terminal is a ground terminal of the battery protection circuit 10A. The VSS terminal is connected to the negative electrode 72 of the secondary battery 70, via the current path 9b. A series circuit of a resistor 21 and a capacitor 22 is connected to between the current path 9a and the current path 9b, so as to be connected to the secondary battery 70 in parallel. The VDD terminal is connected to a connection node between the resistor 21 and the capacitor 22. Thereby, variation in the potential at the VDD terminal can be minimized.

The CS terminal is used to detect charge-overcurrent and discharge-overcurrent each of which flows through the secondary battery 70. The CS terminal is connected to the current path 9b between a current detection resistor 23 and the switching circuit 3. The current detection resistor 23 is inserted in the current path 9b. One end of the current detection resistor 23 is connected to the CS terminal, and the other end of the current detection resistor 23 is connected to the VSS terminal.

The THA terminal is an example of a first terminal for temperature protection. The THA terminal is connected to a given temperature protection terminal of the external device 92. Temperature protection terminals of the external device 92 include a temperature monitor terminal 96 (TH terminal) and a voltage output terminal 95 (VREG terminal). The THA terminal is connected to the monitor terminal 4. The monitor terminal 4 is connected to the TH terminal and is connected to the VREG terminal via reference resistance 93. Note that each of the terminals for temperature protection provided in the battery protection circuit 10A and the external device 92 may be a terminal for temperature detection.

The VREG terminal and the TH terminal are used to implement the temperature protection function in the external device 92. The external device 92 includes a reference voltage source (not illustrated) that generates a constant reference voltage Vreg. The constant reference voltage Vreg generated by the reference voltage source is applied via the VREG terminal. The external device 92 detects a temperature detection voltage Vtha set associated with the THA terminal, via the TH terminal. The external device 92 measures an internal temperature (e.g., the temperature of the secondary battery 70) of the battery pack 100 corresponding to the magnitude of the detected temperature detection voltage Vtha.

The THB terminal is an example of a second terminal for temperature protection. A temperature sensitive element 25 is connected to the THB terminal.

One end of the temperature sensitive element 25 is connected to the THB terminal, and the other end of the temperature sensitive element 25 is connected to the current path 9b between the switching circuit 3 and the GND terminal. A characteristic value (e.g., a resistance value, a voltage magnitude, or the like) for the temperature sensitive element 25 varies according to a change in temperature of the secondary battery 70. The temperature sensitive element 25 is, for example, an NTC thermistor. The NTC thermistor is a resistance temperature detector of which a resistance value varies according to the temperature of the detector, the resistance value varying using negative temperature characteristics.

The battery protection circuit 10A is an integrated circuit that monitors a state of the secondary battery 70, and that protects the secondary battery 70 upon detecting an abnormal state such as overcharge or overheat in the secondary battery 70. The battery protection circuit 10A has a function of protecting the secondary battery 70 from a discharge abnormality such as overdischarge; or a shorting abnormality, by turning the discharge control transistor 2 off. The battery protection circuit 10A has a function of protecting the secondary battery 70 from a charge abnormality such as overcharge, by turning the charge control transistor 1 off. The battery protection circuit 10A has a function of protecting the secondary battery 70 from an overheat abnormality, during discharge, by turning the discharge control transistor 2 off. The battery protection circuit 10A may have a function of protecting the secondary battery 70 from an overheat abnormality, during charge, by turning the charge control transistor 1 off. The battery protection circuit 10A includes the control circuit 50, a conversion circuit 30, and a comparison circuit 40. The control circuit 50 includes a signal generating unit 51.

For example, when overcharge in the secondary battery 70 or charge-overcurrent is continuously detected for a duration of time that exceeds a predetermined detection delay time duration, the control circuit 50 outputs, from the COUT terminal, a signal (e.g., a gate control signal at low level) to turn the charge control transistor 1 from on to off. By turning the charge control transistor 1 off, the control circuit 50 prohibits current, which enables charging in the secondary battery 70, from flowing to the current path 9b. Thereby, the charging of the secondary battery 70 is disabled and thus the secondary battery 70 can be protected from overcharge or charge-overcurrent.

For example, when overdischarge in the secondary battery 70 or discharge-overcurrent is continuously detected for a duration of time that exceeds a predetermined detection delay time duration, the control circuit 50 outputs, from the DOUT terminal, a signal (e.g., a gate control signal at low level) to turn the discharge control transistor 2 from on to off. By turning the discharge control transistor 2 off, the control circuit 50 prohibits current, which enables the discharging in the secondary battery 70, from flowing to the current path 9b. Thereby, the discharging of the secondary battery 70 is disabled and thus the secondary battery 70 can be protected from overdischarge or discharge-overcurrent.

The signal generating unit 51 is used to measure the detection delay time in order to prevent false detection for overcharge or the like. For example, the signal generating unit 51 has a counter circuit that counts an input predetermined pulse signal. The signal generating unit 51 outputs a periodic signal 52 from the counter circuit, the periodic signal 52 periodically changing the voltage to a high level and a low level. The periodic signal 52 is, for example, a square wave signal.

The conversion circuit 30 converts the characteristic value for the temperature sensitive element 25 into a voltage corresponding to the change in the temperature of the secondary battery 70, and then outputs the voltage. The conversion circuit 30 includes, for example, a first switch unit 31, a second switch unit 32, a reference voltage source 33, reference resistance 34, and a resistive element 35.

Figure 14:
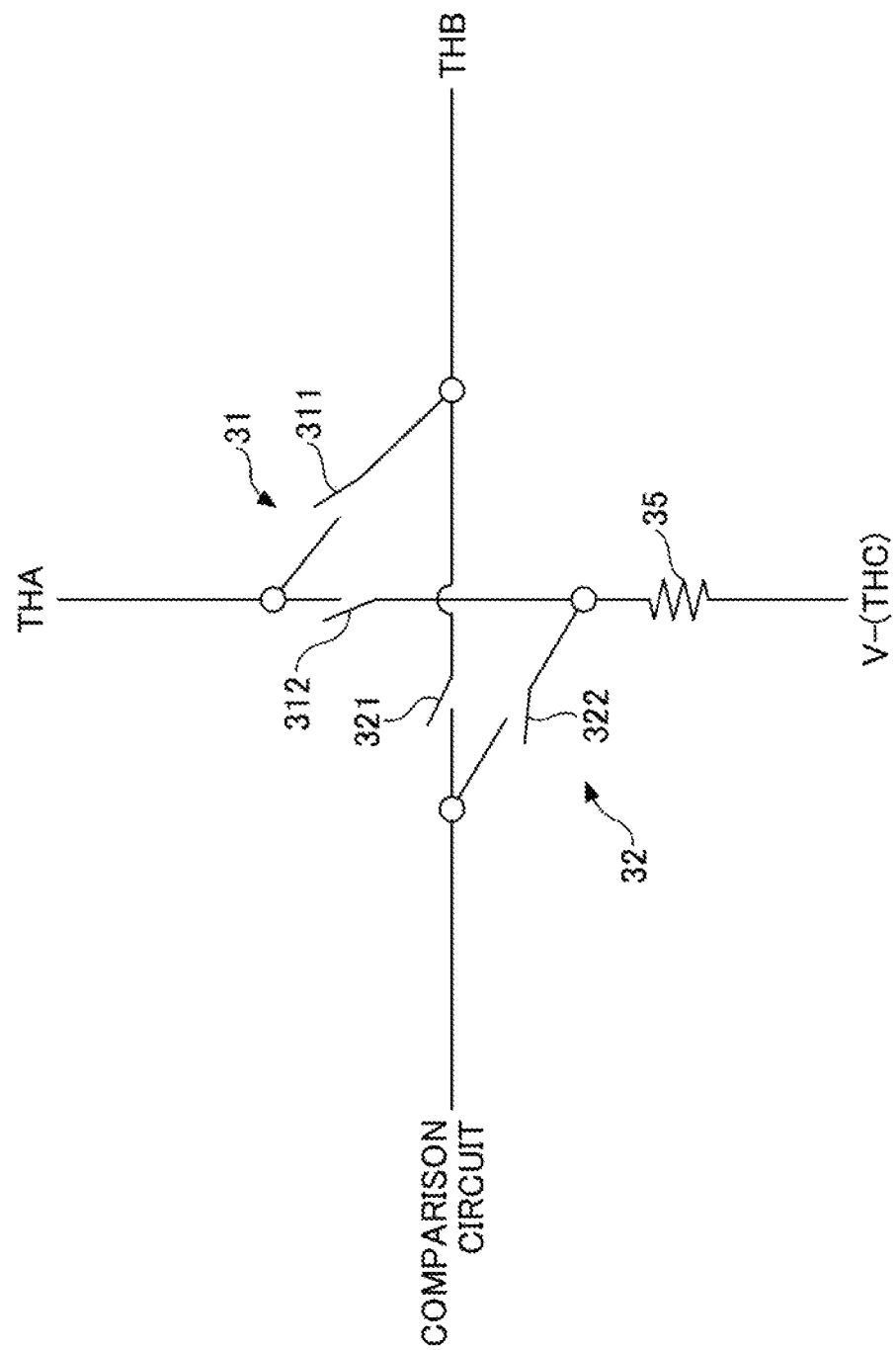
FIG. 14 is a diagram illustrating an example of the configuration of a first switch unit and a second switch unit.

The first switch unit 31 is a switching circuit that is controlled in accordance with a switch signal 53 output from the control circuit 50. As illustrated in FIG. 14, the first switch unit 31 includes a switch 311 provided between the THA terminal and the THB terminal, and includes a switch 312 provided between the THA terminal and the V− terminal, where the resistive element 35 is provided between the switch 312 and the V− terminal. The switch 311 and the switch 312 operate complementarily. When the switch 311 is in an on-state, the THA terminal is connected to the THB terminal. When the switch 311 is in an off-state, a portion between the THA terminal and the THB terminal is open so that the THA terminal and the THB terminal are disconnected from each other. When the switch 312 is in an on-state, the THA terminal is connected to the V− terminal. When the switch 312 is in an off-state, a portion between the THA terminal and the V− terminal is open so that the THA terminal and the V− terminal are disconnected from each other.

In FIGS. 1 and 2, the second switch unit 32 is a switching circuit that is controlled in accordance with the switch signal 53 output from the control circuit 50. As illustrated in FIG. 14, the second switch unit 32 includes a switch 321 provided between the comparison circuit 40 and the THB terminal, and includes a switch 322 provided between the comparison circuit 40 and the V− terminal, where the resistive element 35 is connected to the V− terminal. The switch 321 and the switch 322 operate complementarily. When the switch 321 is in an on-state, the comparison circuit 40 is connected to the THB terminal. when the switch 321 is in an off-state, a portion between the comparison circuit 40 and the THB terminal is open so that the comparison circuit 40 and the THB terminal are disconnected from each other. When the switch 322 is in an on-state, the comparison circuit 40 is connected to the V− terminal. When the switch 322 is in an off-state, a portion between the comparison circuit 40 and the V− terminal is open so that the comparison circuit 40 and the V− terminal are disconnected from each other.

The switch 311 and the switch 321 also operate complementarily. The switch 311 is an example of a first switch, and the switch 321 is an example of a second switch. The switch 322 is an example of a third switch, and the switch 312 is an example of a fourth switch.

In FIGS. 1 and 2, the reference voltage source 33 generates a constant reference voltage Vr. The reference resistance 34 is an element of which one end is connected to the reference voltage source 33 and of which the other end is connected to a monitor line between the input of the comparison circuit 40 and the second switch unit 32. The resistive element 35 is an element of which one end is connected to the V− terminal and of which the other end is selectively connected to either of the THA terminal or the input of the comparison circuit 40, via a given switch from among the switch 312 of the first switch unit 31 and the switch 322 of the second switch unit 32.

In the comparison circuit 40, a comparator 41 compares a voltage (hereinafter, also referred to as an output voltage Vx of the conversion circuit 30) output, via the second switch unit 32, from the conversion circuit 30 with a predetermined threshold voltage 42. Further, the comparator 41 outputs a compared result to the control circuit 50. The comparator 41 has a non-inverting input to which the output voltage Vx is applied, and has an inverting input to which the threshold voltage 42 is applied.

The control circuit 50 controls the switching circuit 3 based on the output of the comparison circuit 40. When an output voltage Vx lower than the threshold voltage 42 is continuously detected using the comparison circuit 40 for a duration of time that exceeds a predetermined temperature detection delay time duration, the control circuit 50 turns off at least one from among the discharge control transistor 2 or the charge control transistor 1. The output voltage Vx lower than the threshold voltage 42 signifies a state in which the temperature of the secondary battery 70 is higher than a detection temperature (equivalent to a detection temperature A2 described below) corresponding to the threshold voltage 42. When the discharge control transistor 2 is turned off, the discharging of the secondary battery 70 is disabled so that the secondary battery 70 can be protected from an overheat abnormality during discharge. When the charge control transistor 1 is turned off, the charging of the secondary battery 70 is disabled so that the secondary battery 70 can be protected from an overheat abnormality during charge.

Hereafter, the temperature protection operation of the battery protection circuit 10A will be described in more detail with reference to FIGS. 1, 2, and 14.

The battery protection circuit 10A has a configuration that enables selective switching between an external device 92-based temperature protection mode (FIG. 1) and a battery protection circuit 10A-based temperature protection mode (FIG. 2).

When the external device 92 operates in the temperature protection mode (FIG. 1), the control circuit 50 turns on the switch 311 that is provided between the THA terminal and the THB terminal, and turns off the switch 321 that is provided between the comparison circuit 40 and the THB terminal. When the switch 311 provided between the THA terminal and the THB terminal is turned on, the THA terminal is in a state of being connected to the THB terminal. In this case, a series circuit of reference resistance 93 and the temperature sensitive element 25 is connected to between the VREG terminal and the GND terminal of the external device 92. Thereby, a voltage (temperature detection voltage Vtha) set by dividing the reference voltage Vreg due to the reference resistance 93 and the temperature sensitive element 25 is applied to the TH terminal. For the reference resistance 93, a resistance value is almost unchanged with respect to a temperature change and is sufficiently small compared to the temperature sensitive element 25. The temperature detection voltage Vtha is supplied to the external device 92 via the TH terminal. When the temperature detection voltage Vtha that is lower than a threshold voltage corresponding to a predetermined detection temperature A1 is continuously detected for a duration of time that exceeds a predetermined temperature detection delay time duration, the external device 92 interrupts the charge current output from the VCC terminal. Thereby, the charging of the secondary battery 70 is disabled and thus the secondary battery 70 can be protected from an overheat abnormality during charge. The temperature detection voltage Vtha lower than the threshold voltage corresponding to the detection temperature A1 signifies a state in which the temperature of the secondary battery 70 is higher than the detection temperature A1.

In contrast, in the temperature protection mode (FIG. 1) by the external device 92, when the switch 321 that is provided between the comparison circuit 40 and the THB terminal is turned off, the comparison circuit 40 the THB terminal are disconnected from each other, so that the connection between the temperature sensitive element 25 and the comparison circuit 40 can be interrupted. When the switch 311 is turned on, the control circuit 50 turns the switch 321 off and turns the switch 322 on, so that the comparison circuit 40 becomes connected to the resistive element 35, which is different from the temperature sensitive element 25. By setting the resistive element 35 at a resistance value similar to that for the temperature sensitive element 25, the comparison circuit 40 can determine that the temperature is normal. Thereby, in temperature protection mode in which the external device 92 operates, the temperature protection function in the battery protection circuit 10A can be prevented from being erroneously implemented.

When the battery protection circuit 10A operates in the temperature protection mode (FIG. 2), the control circuit 50 turns off the switch 311 that is provided between the THA terminal and the THB terminal and turns on the switch 321 that is provided between the comparison circuit 40 and the THB terminal. When the switch 321 provided between the comparison circuit 40 and the THB terminal is turned on, the comparison circuit 40 is connected to the THB terminal. Thereby, a voltage (temperature detection voltage Vthb) set by dividing the reference voltage Vr across a reference voltage source 33, due to the reference resistance 34 and the temperature sensitive element 25, is applied to the non-inverting input of the comparator 41. For the reference resistance 34, a resistance value is almost unchanged with respect to a temperature change, and is sufficiently small compared to the temperature sensitive element 25. When the temperature detection voltage Vthb lower than a threshold voltage 42 corresponding to the predetermined detection temperature A2 is continuously detected for a duration of time that exceeds a predetermined temperature detection delay time duration, the control circuit 50 turns the discharge control transistor 2 off. Thereby, the discharging of the secondary battery 70 is disabled and thus the secondary battery 70 can be protected from an overheat abnormality during discharge.

In contrast, in the temperature protection mode (FIG. 2) by the battery protection circuit 10A, when the switch 311 provided between the THA terminal and the THB terminal is turned off, the THA terminal is disconnected from the THB terminal, so that the connection between the temperature sensitive element 25 and each of the VREG terminal and the TH terminal of the external device 92 can be interrupted. When the switch 321 is turned on, the control circuit 50 turns the switch 311 off and turns the switch 312 on, the THA terminal becomes connected to the resistive element 35, which is different from the temperature sensitive element 25. By setting the resistive element 35 at a resistance value similar to that of the temperature sensitive element 25, the external device 92 can determine that the temperature is normal. Thereby, in temperature protection mode in which the battery protection circuit 10A operates, the temperature protection function in the external device 92 can be prevented from being erroneously implemented.

In this example, the V− terminal is a detection terminal used to detect the connection with the external device 92. When the switch 312 is turned on, the control circuit 50 causes the THA terminal to be connected to the current path between the switching circuit 3 and the external device 92 and in the charge-and-discharge path 9b. The THA terminal is connected via the resistive element 35, the V− terminal, and the resistor 24. A resistance value for the resistive element 35 is sufficiently greater than that for the resistor 24.

As described above, the temperature protection provided by the external device 92 and the temperature protection provided by the battery protection circuit 10A can be alternately enabled. Thus, one temperature sensitive element 25 can be shared between the temperature protection function in the battery protection circuit 10A and the temperature protection function in the external device 92. Hence, the battery protection circuit 10A can be made compact and costs can be reduced.

When the voltage associated with the THA terminal is a first voltage V1, the control circuit 50 turns on the switch 311 that is provided between the THA terminal and the THB terminal, and turns off the switch 321 that is provided between the comparison circuit 40 and the THB terminal, to thereby switch to the external device 92-based temperature protection mode. In contrast, when the voltage associated with the THA terminal is a second voltage V2, the control circuit 50 turns the switch 311 off and turns the switch 321 on to thereby switch to the battery protection circuit 10A-based temperature protection mode. The second voltage V2 is lower than the first voltage V1 (V2<V1). In such a configuration, when the external device 92 sets the reference voltage Vreg at a first voltage value v1, the control circuit 50 can switch to the temperature protection mode in which the external device 92 operates. When the external device 92 sets the reference voltage Vreg at a second voltage value v2, the control circuit 50 can switch to the temperature protection mode in which the battery protection circuit 10A operates. The second voltage value v2 is less than the first voltage value v1. The second voltage value v2 may be zero. As described above, when the external device 92 varies the magnitude of the reference voltage Vreg, an instruction to switch the temperature protection modes can be sent by the external device 92.

The control circuit 50 may alternatively turn on the switch 311 and the switch 321 in accordance with the switch signal 53 (the periodic signal 52 may be used) that is a periodic signal generated based on the periodic signal 52. Thereby, the temperature protection mode in which the external device 92 operates and the temperature protection mode in which the battery protection circuit 10A operates are automatically switched at regular intervals. Accordingly, temperature protection provided by both the external device and the battery protection circuit can be achieved using one temperature sensitive element 25.

Figure 3:
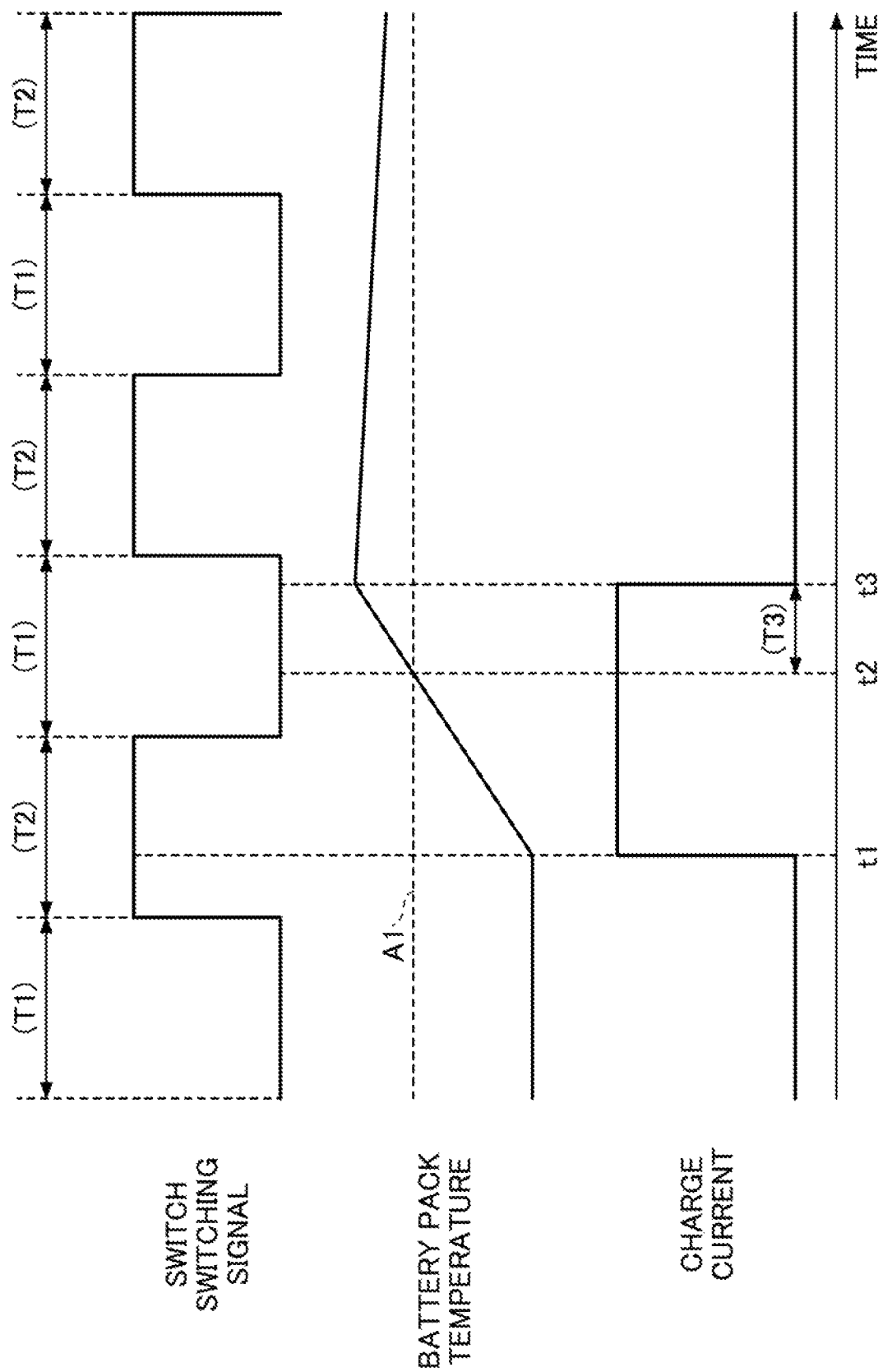
FIG. 3 is a diagram illustrating an example of a temperature protection operation by the external device.
Figure 4:
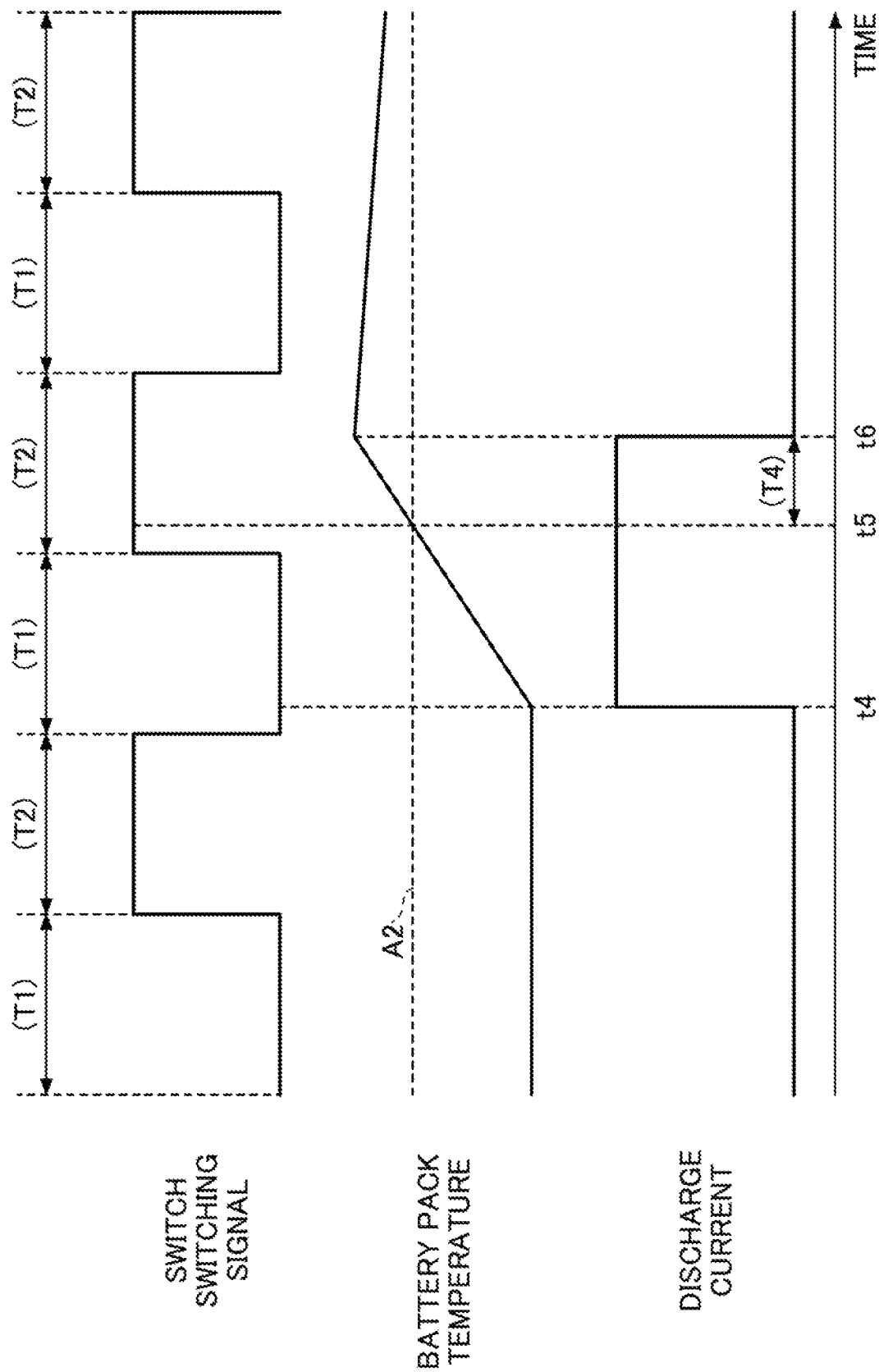
FIG. 4 is a diagram illustrating an example of the temperature protection operation by the secondary battery protection circuit.

When the temperature protection function is implemented, the temperature detection delay time is set in order to prevent malfunction or the like. FIG. 3 is a diagram illustrating an example of the temperature protection operation by the external device. FIG. 4 is a diagram illustrating an example of the temperature protection operation by the secondary battery protection circuit.

In FIGS. 3 and 4, a period during which the external device 92 operates in the temperature protection mode is expressed by T1, and a period during which the battery protection circuit 10A operates in the temperature protection mode is expressed by T2. The temperature detection delay time set for the external device 92 is expressed by T3, and the temperature detection delay time set for the battery protection circuit 10A is expressed by T4. The period T1 corresponds to a period during which the switch 311 is on, and the period T2 corresponds to a period during which the switch 321 is on.

In FIG. 3, when the charge current flows, the temperature of the battery pack 100 increases (time point t1). The temperature detection delay time T3 corresponds to a length of time (t2 to t3) to interrupt the charge current through the secondary battery 70, after the external device 92 has detected an increase in temperature to exceed the detection temperature A1. In FIG. 4, when the discharge current flows, the temperature of the battery pack 100 increases (time point t4). The temperature detection delay time T4 corresponds to a length of time (t5 to t6) for the control circuit 50 to interrupt the discharge current in the secondary battery 70, by the switching circuit 3, after the comparison circuit 40 has detected an increase in temperature exceeding the detection temperature A2.

As illustrated in FIGS. 3 and 4, when T1 is set to be longer than T3, and T2 is set to be longer than T4, the temperature protection function in the external device 92 and the temperature protection function in the battery protection circuit 10A can be prevented from being erroneously implemented.

The control circuit 50 uses the signal generating unit 51 to generate the detection delay time, with respect to whether overvoltage or overcurrent (more particularly, overcharge, overdischarge, discharge-overcurrent, or charge-overcurrent) for the secondary battery 70 is detected. Thereby, the signal generating unit 51 can be commonly used to set the temperature detection delay times T3 and T4, as well as the detection delay times for overcharge, overdischarge, discharge-overcurrent, or charge-overcurrent for the secondary battery 70. Accordingly, the battery protection circuit 10A can be made compact.

Figure 5:
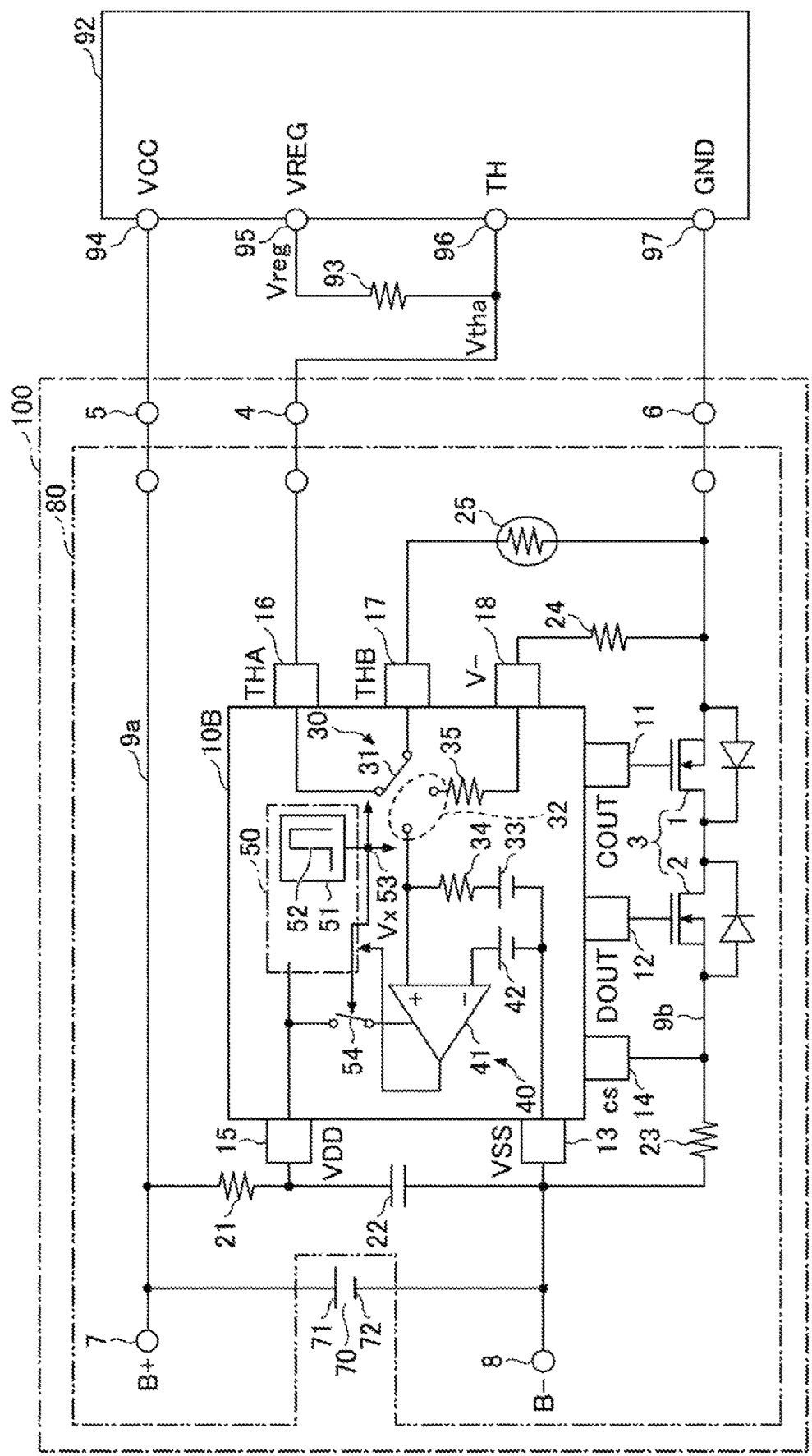
FIG. 5 is a diagram illustrating an example of a second configuration (external device-based temperature protection mode) of the battery pack.
Figure 6:
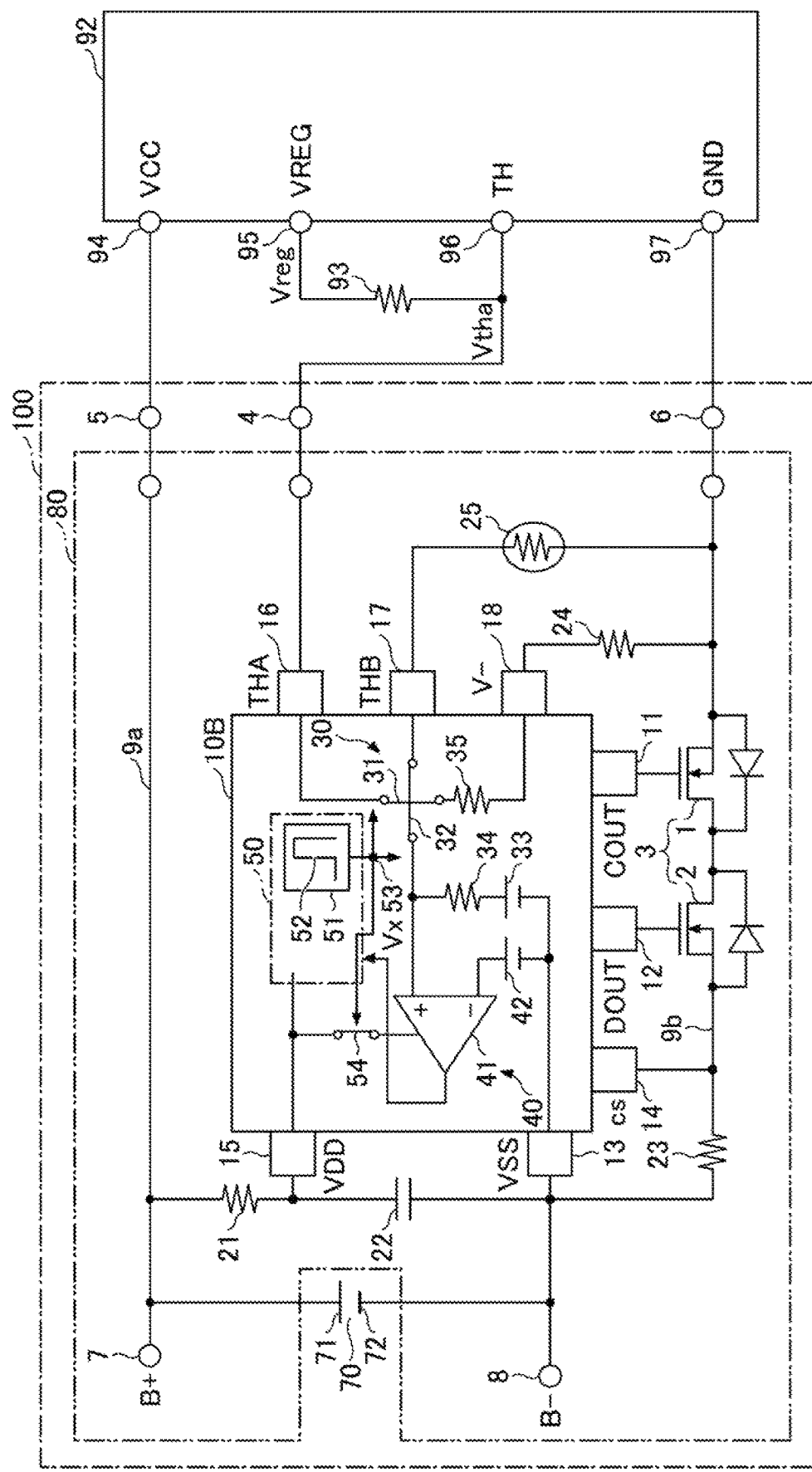
FIG. 6 is a diagram illustrating an example of the second configuration (secondary battery protection circuit-based temperature protection mode) of the battery pack.

FIG. 5 is a diagram illustrating an example of a second configuration (the external device-based temperature protection mode) of the battery pack. FIG. 6 is a diagram illustrating an example of the second configuration of the battery pack (secondary battery protection circuit-based temperature protection mode). In FIGS. 5 and 6, the description for the same configuration as that described in the example of the first configuration will be omitted. Such description is incorporated herein by reference.

In FIG. 5, when the external device 92 operates in the temperature protection mode (when the switch 311 is turned on and the switch 321 is turned off), the control circuit 50 shuts off a switch 54 that is inserted in a power supply line via which power is supplied to the comparison circuit 40 by the secondary battery 70. Thereby, the control circuit 50 interrupts the power supply line. In this case, the current through the comparison circuit 40 is minimized, so that power consumption for the battery protection circuit 10B can be reduced. The switch 54 is an example of a fifth switch. Further, when the external device 92 operates in the temperature protection mode (when the switch 311 is turned on and the switch 321 is turned off), the control circuit 50 turns the switch 322 off to thereby interrupt the connection between the comparison circuit 40 and the resistive element 35. Thereby, the current through the resistive element 35 is minimized, so that power consumption for the secondary battery protection circuit can be reduced.

In FIG. 6, when the battery protection circuit 10B operates in the temperature protection mode (when the switch 311 is turned off and the switch 321 is turned on), the control circuit 50 turns the switch 54 on so that the comparison circuit 40 becomes connected to the power supply line. Thereby, the temperature protection function can be implemented by the battery protection circuit 10B.

Figure 7:
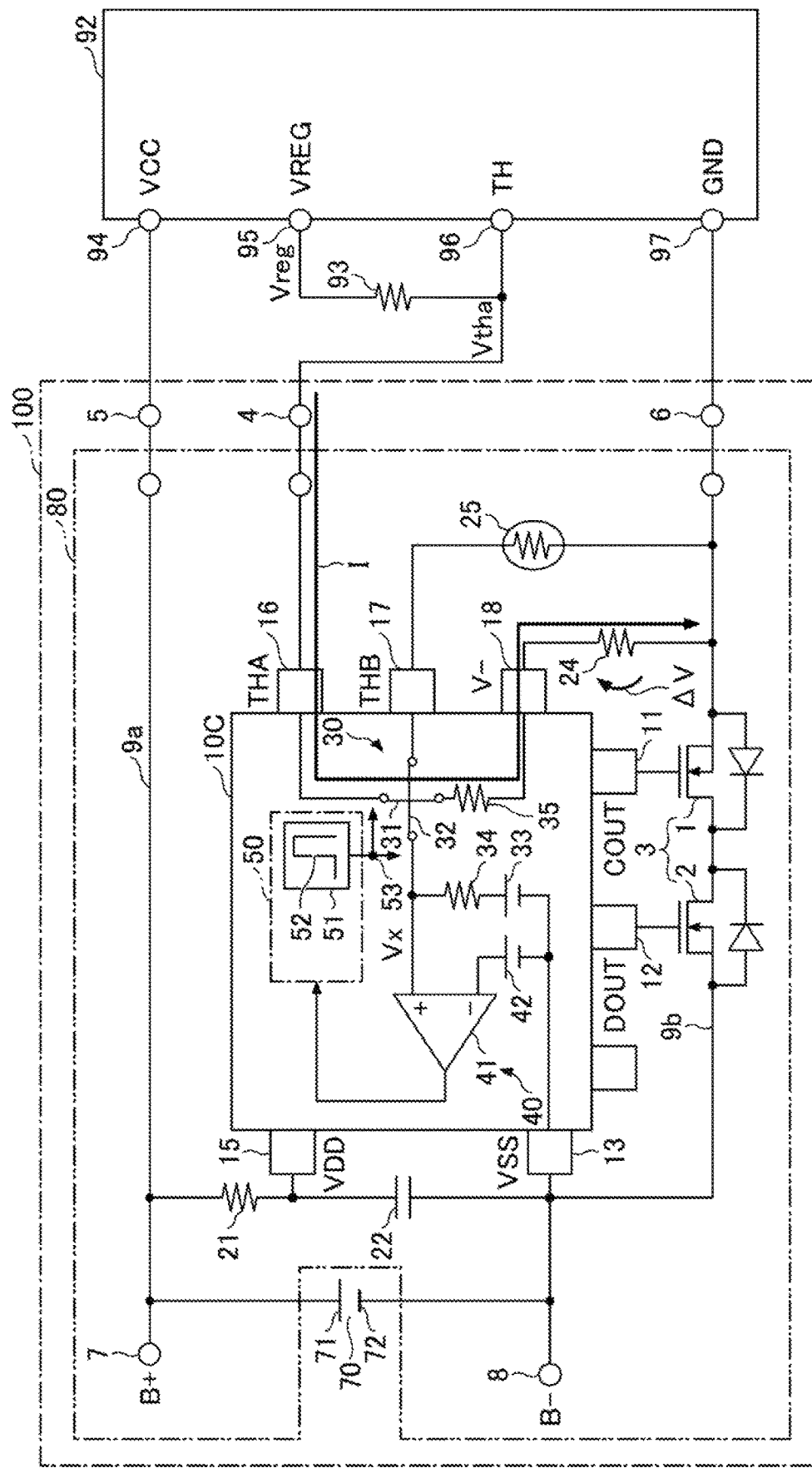
FIG. 7 is a diagram illustrating an example of a third configuration (secondary battery protection circuit-based temperature protection mode) of the battery pack.
Figure 8:
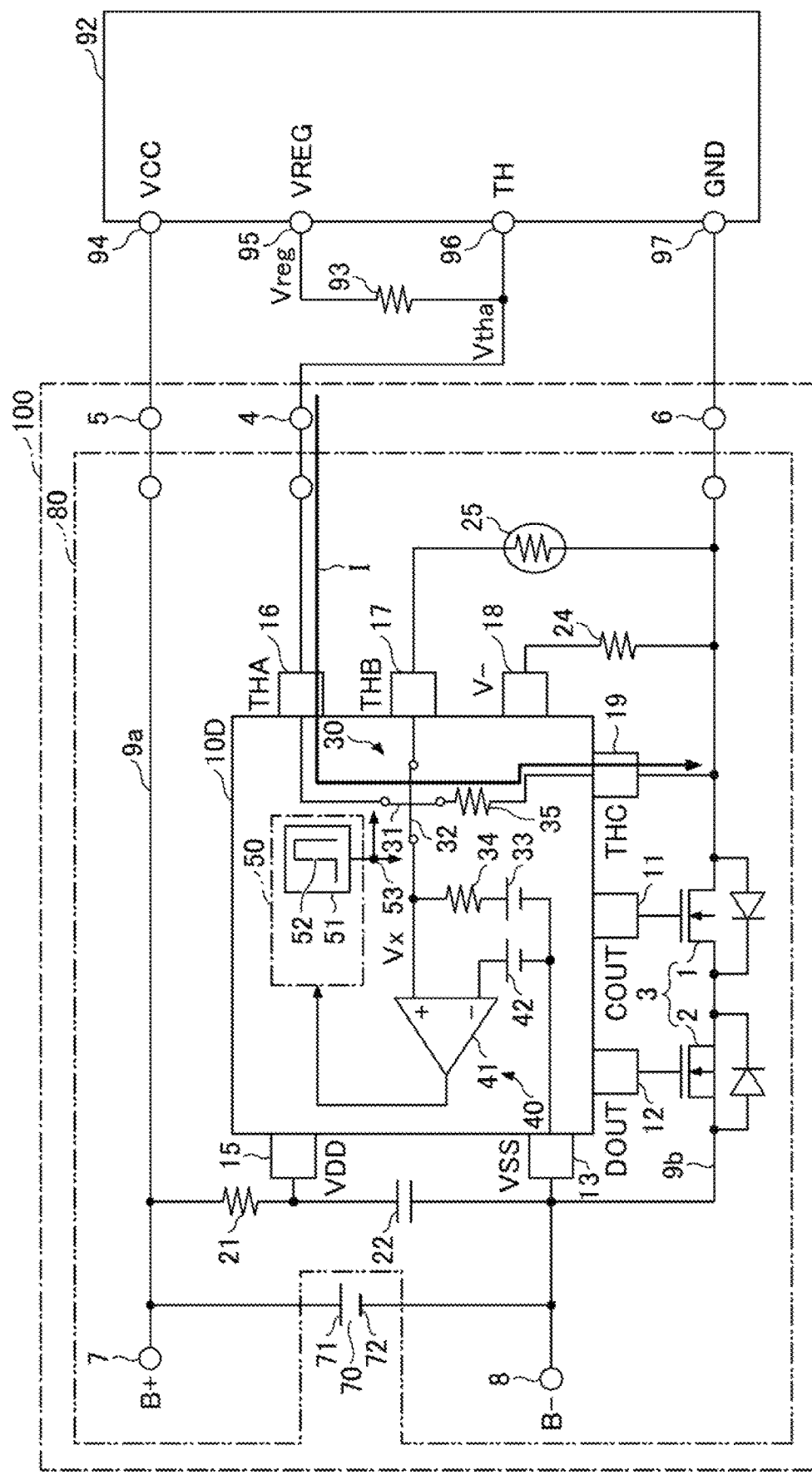
FIG. 8 is a diagram illustrating an example of a fourth configuration (secondary battery protection circuit-based temperature protection mode) of the battery pack.

FIG. 7 is a diagram illustrating an example of a third configuration (secondary battery protection circuit-based temperature protection mode) of the battery pack. FIG. 8 is a diagram illustrating an example of a fourth configuration (secondary battery protection circuit-based temperature protection mode) of the battery pack. In FIGS. 7 and 8, the description for the same configuration as that described in the example of the first configuration will be omitted. Such description is incorporated herein by reference.

In a case where discharge-overcurrent and charge-overcurrent are each detected in accordance with the magnitude of the voltage set associated with the V− terminal, while the battery protection circuit 10C operates in the temperature protection mode as illustrated in FIG. 7, a voltage drop ΔV occurring across the resistor 24 increases due to a current I that flows through the battery protection circuit 10C, via the switch 312 of the first switch unit 31. For this reason, the voltage associated with the V− terminal varies, and thus detection accuracy of discharge-overcurrent and charge-overcurrent is negatively affected.

In contrast, the battery protection circuit 10D illustrated in FIG. 8 includes an auxiliary terminal 19 (THC terminal) that is connected to the current path between the switching circuit 3 and the external device 92 and in the charge-and-discharge path 9b. When the battery protection circuit 10D operates in the temperature protection mode, the THC terminal serves as a port for externally passing the current I that flows through the battery protection circuit 10D, via the switch 312 of the first switch unit 31. When the switch 321 of the second switch unit 32 is turned on, the control circuit 50 turns on the switch 312 of the first switch unit 31, so that the THA terminal becomes connected to the current path between the switching circuit 3 and the external device 92 and in the charge-and-discharge path 9b. While in this state, the THA terminal is connected via the THC terminal without using the V− terminal. Thereby, variation in the voltage associated with the V− terminal is minimized. Accordingly, any decreases in detection accuracy of discharge-overcurrent and charge-overcurrent can be avoided.

Figure 9:
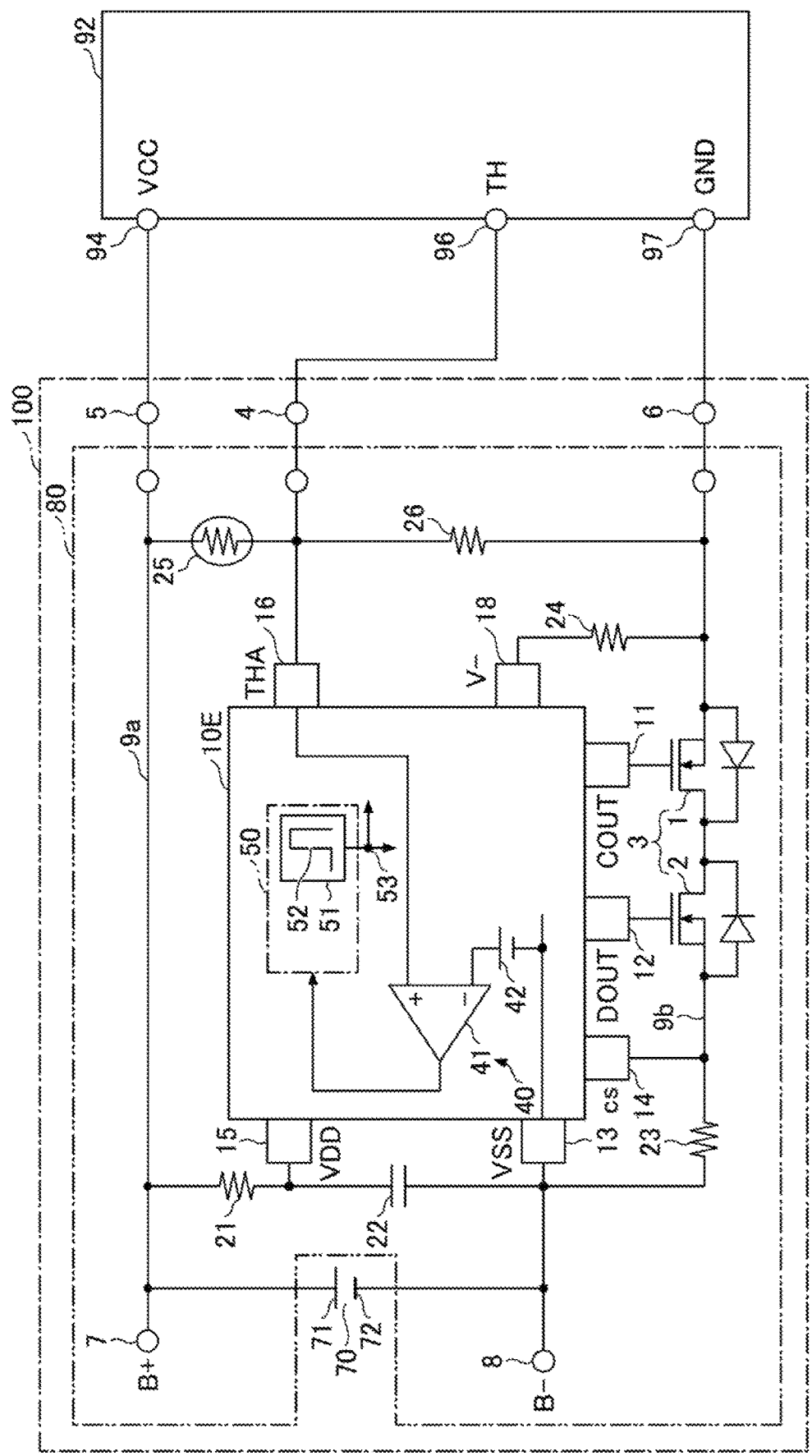
FIG. 9 is a diagram illustrating an example of a fifth configuration of the battery pack.
Figure 10:
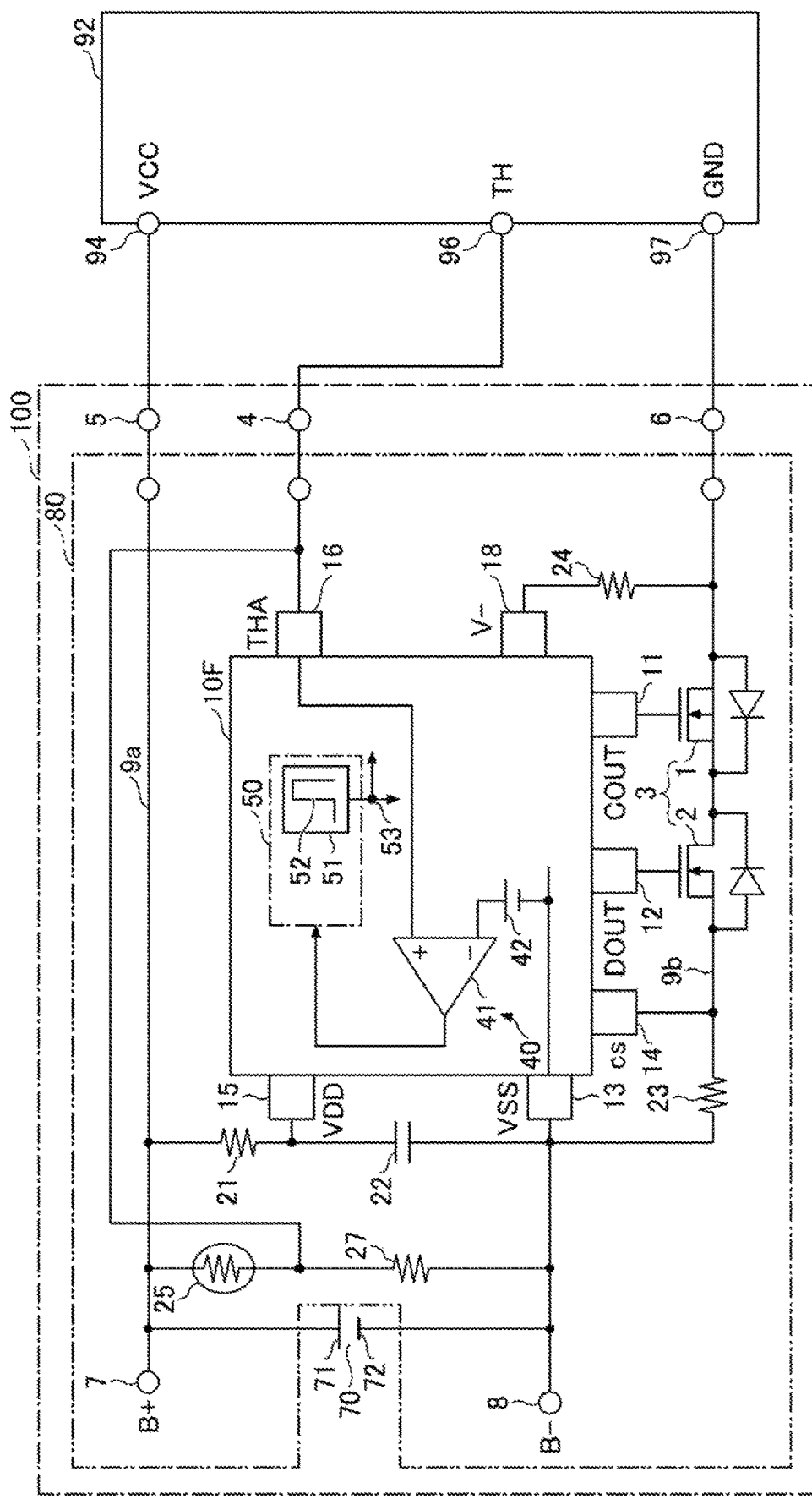
FIG. 10 is a diagram illustrating an example of a sixth configuration of the battery pack.

FIG. 9 is a diagram illustrating an example of a fifth configuration of the battery pack. FIG. 10 is a diagram illustrating an example of a sixth configuration of the battery pack. In FIGS. 9 and 10, the description for the same configuration as that described in the example of the first configuration will be omitted. Such description is incorporated herein by reference. FIGS. 9 and 10 illustrate the configurations each of which does not switch to a path offered to the current that is through the temperature sensitive element 25 via a given battery protection circuit from among battery protection circuits 10E and 10F.

In the configuration of FIG. 9, when the protection function in the battery protection circuit 10E is implemented (when the switching circuit 3 is in the off-state), the temperature protection function in the battery protection circuit 10E cannot be implemented because the V− terminal and the VSS terminal are not set at same potential. In the configuration in FIG. 10, the temperature protection function in the battery protection circuit 10F can be implemented regardless of the potential at the V− terminal.

Figure 11:
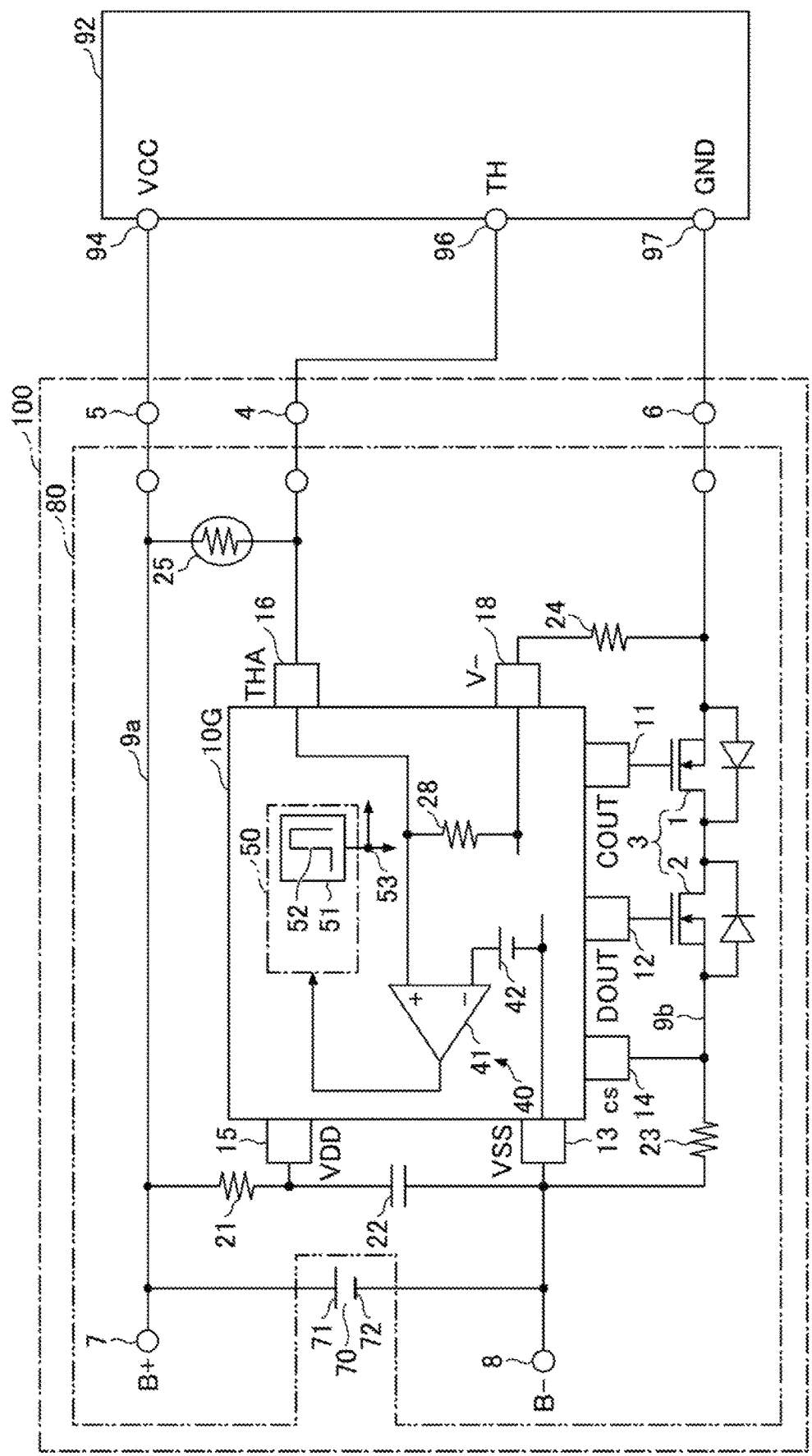
FIG. 11 is a diagram illustrating an example of a seventh configuration of the battery pack.
Figure 12:
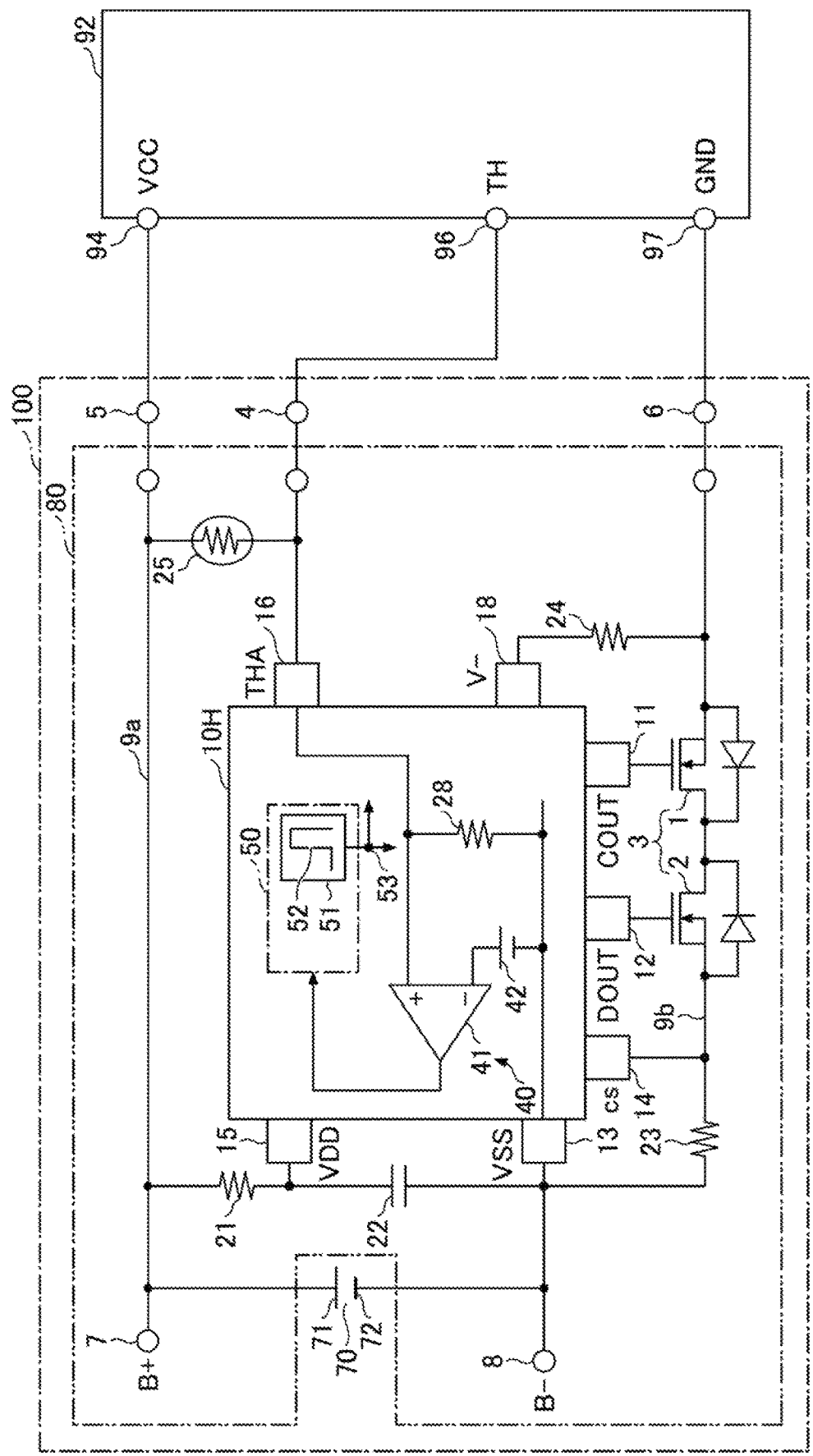
FIG. 12 is a diagram illustrating an example of an eighth configuration of the battery pack.

FIG. 11 is a diagram illustrating an example of a seventh configuration of the battery pack. FIG. 12 is a diagram illustrating an example of an eighth configuration of the battery pack. In FIGS. 11 and 12, the description for the same configuration as that described in the example of the first configuration will be omitted. Such description is incorporated herein by reference. FIGS. 11 and 12 illustrate examples in which s battery protection circuit 10G and 10E each include reference resistance 28 that is connected in series to the temperature sensitive element 25. As in the case in FIGS. 9 and 10, in the configuration in FIG. 11, when the protection function in the battery protection circuit 10G is implemented (when the switching circuit 3 is in the off-state), the temperature protection function in the battery protection circuit 10G cannot be implemented because the V− terminal and the VSS terminal are not set at the same potential. In the case in FIG. 12, the temperature protection function in a battery protection circuit 10H can be implemented regardless of the potential at the V− terminal.

Figure 13:
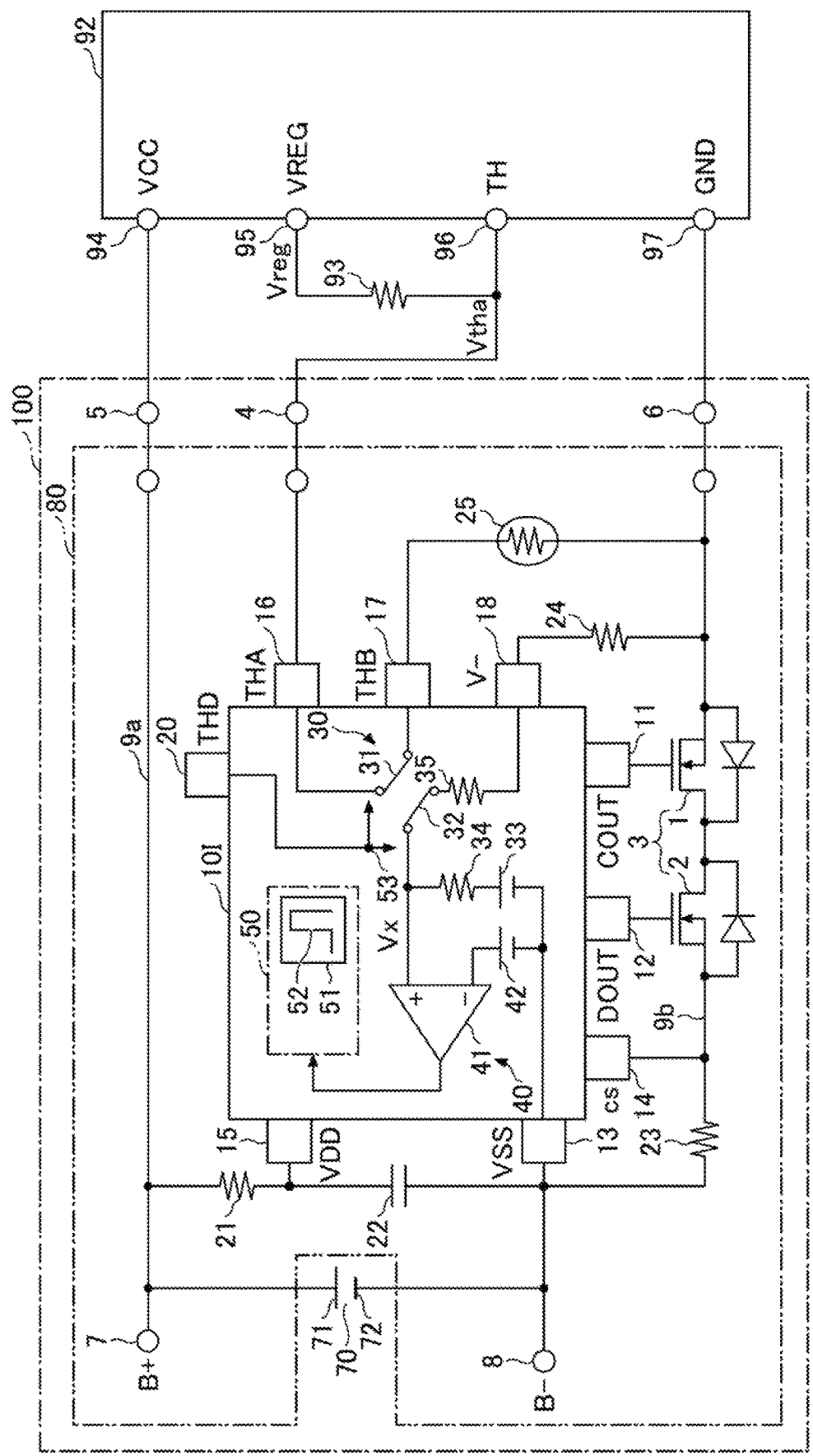
FIG. 13 is a diagram illustrating an example of a ninth configuration of the battery pack.

FIG. 13 is a diagram illustrating an example of a ninth configuration (external device-based temperature protection mode) of the battery pack. In FIG. 13, the description for the same configuration as that described in the example of the first configuration will be omitted. Such description is incorporated herein by reference. FIG. 13 illustrates an example in which a switching operation between the temperature protection mode in which a battery protection circuit 10I operates and the temperature protection mode in which the external device 92 operates is performed in accordance with the switch signal 53 from the outside. The switch signal 53 from the outside is different from a given switch signal 53 that is generated based on the periodic signal 52, which is generated by the battery protection circuit 10I. The battery protection circuit 10I includes a switch terminal 20 (THD terminal) to which the switch signal 53 is applied from the outside (e.g., the external device 92).

One or more embodiments have been described above. It would be understood that various modifications to the embodiments can be made without departing from a scope described in the present disclosure. Various changes or alternatives, including combinations of some or all of the different embodiments, can be made.

For example, the temperature sensitive element is not limited to a thermistor, but may be a semiconductor temperature sensor that detects temperature by a semiconductor element such as a diode. Since the diode has a negative temperature characteristic, a forward voltage across the diode, as a characteristic value, decreases as temperature increases. In light of the point described above, a constant current passed by a constant current source is passed to the diode.

The charge control transistor 1 and the discharge control transistor 2 may be replaced with each other with respect to the locations in the drawing.

In the technique described above, although the charge control transistor 1 and the discharge control transistor 2 are inserted in the current path 9b, this configuration is not limiting. A configuration in which the charge control transistor 1 and the discharge control transistor 2 are inserted in the current path 9a, may be adopted.

In the embodiments, instead of the secondary battery protection circuit, a temperature detection circuit that is connected to an external device may be adopted. For example, instead of the battery protection circuit illustrated in FIG. 1 or the like, a temperature detection circuit that detects a temperature of the secondary battery may be adopted. The temperature detection circuit includes a first terminal configured to be electrically connected to a temperature detection terminal of an external device; a second terminal to which a temperature sensitive element is configured to be electrically connected, a characteristic value for the temperature sensitive element varying according to a change in temperature of the secondary battery; a conversion circuit configured to convert the characteristic value into a voltage corresponding to the change in the temperature of the secondary battery, the conversion circuit being configured to output the voltage; and a comparison circuit configured to compare the output voltage of the conversion circuit with a threshold voltage. The conversion circuit includes a first switch provided between the first terminal and the second terminal, and includes a second switch provided between the comparison circuit and the second terminal. The first switch and the second switch are configured to be selectively turned on.

What is claimed is:

1. A secondary battery protection circuit for controlling charge and discharge using a switching circuit to protect a secondary battery from temperature, the switching circuit configured to be provided in a charge-and-discharge path between the secondary battery and an external device, the secondary battery protection circuit comprising:
- a detection terminal configured to be electrically connected, via a resistor, to between the switching circuit and the external device;
- a first terminal configured to be electrically connected to a temperature detection terminal of the external device;
- a second terminal to which a temperature sensitive element is configured to be electrically connected, the temperature sensitive element having a characteristic value varying in accordance with a change in temperature of the secondary battery;
- a conversion circuit configured to convert the characteristic value into a voltage corresponding to the change in the temperature of the secondary battery, the conversion circuit being configured to output the voltage;
- a comparison circuit configured to compare the output voltage of the conversion circuit with a threshold voltage and output a compared result; and
- a control circuit configured to control the switching circuit based on the output of the comparison circuit,
- wherein the conversion circuit includes a first switch provided between the first terminal and the second terminal, and includes a second switch provided between the comparison circuit and the second terminal, and
- wherein the first switch and the second switch are configured to be controlled by the control circuit.

2. The secondary battery protection circuit according to claim 1, wherein the temperature sensitive element is an NTC thermistor.

3. The secondary battery protection circuit according to claim 1, wherein the control circuit is configured to:
- turn the first switch on and turn the second switch off, upon determining that a voltage associated with the first terminal is a first voltage, and
- turn the first switch off and turn the second switch on, upon determining that the voltage associated with the first terminal is a second voltage lower than the first voltage.

4. The secondary battery protection circuit according to claim 1, further comprising a signal generating unit configured to generate a periodic signal,
- wherein the control circuit is configured to alternately turn on the first switch and the second switch in accordance with the periodic signal.

5. The secondary battery protection circuit according to claim 4, wherein a period during which the first switch is on is longer than a length of time to interrupt a charge current through the secondary battery, after the external device has detected an increase in temperature of the secondary battery, the switching circuit, or the secondary battery protection circuit, and
- wherein a period during which the second switch is on is longer than a length of time for the control circuit to cause the switching circuit to interrupt a discharge current in the secondary battery, after a change in the output of the comparison circuit is determined.

6. The secondary battery protection circuit according to claim 4, wherein the control circuit is configured to use the signal generating unit to generate a detection delay time duration, with respect to whether overvoltage or overcurrent for the secondary battery is detected.

7. The secondary battery protection circuit according to claim 1, further comprising a third switch provided between the comparison circuit and the detection terminal; and a resistive element provided between the third switch and the detection terminal,
- wherein the control circuit is configured to turn the second switch off and turn the third switch on, in response to turning the first switch on.

8. The secondary battery protection circuit according to claim 1, further comprising a fourth switch provided between the first terminal and the detection terminal; and
- a resistive element provided between the fourth switch and the detection terminal,
- wherein the control circuit is configured to turn the first switch off and turn the fourth switch on, in response to turning the second switch on.

9. The secondary battery protection circuit according to claim 1, further comprising a fifth switch inserted in a power supply line via which power is supplied to the comparison circuit by the secondary battery,
- wherein in response to turning the first switch on and turning the second switch off, the control circuit is configured to shut off the fifth switch.

10. The secondary battery protection circuit according to claim 1, further comprising an auxiliary terminal configured to be electrically connected to a current path in the charge-and-discharge path, the current path being between the switching circuit and the external device; and
- a resistive element,
- wherein in response to turning the second switch on, the control circuit is configured to cause the first terminal to be electrically connected to the current path via the resistive element and the auxiliary terminal, without using the detection terminal.

11. A secondary battery protection apparatus comprising:
- a temperature sensitive element, the temperature sensitive element having a characteristic value varying in accordance with to a change in temperature of a secondary battery;
- a switching circuit configured to be provided in a charge-and-discharge path between the secondary battery and an external device; and
- a secondary battery protection circuit configured to control charge and discharge using the switching circuit to protect the secondary battery from temperature, the secondary battery protection circuit including:
  - a first terminal configured to be electrically connected to a temperature detection terminal of the external device;
  - a second terminal to which the temperature sensitive element is electrically connected;
  - a conversion circuit configured to convert the characteristic value for the temperature sensitive element into a voltage corresponding to the change in the temperature of the secondary battery, the conversion circuit being configured to output the voltage;
  - a comparison circuit configured to compare the output voltage of the conversion circuit with a threshold voltage and output a compared result; and
  - a control circuit configured to control the switching circuit based on the output of the comparison circuit,
- wherein the conversion circuit includes a first switch provided between the first terminal and the second terminal, and includes a second switch provided between the comparison circuit and the second terminal, and
- wherein the first switch and the second switch are configured to be controlled by the control circuit.

12. A battery pack comprising:
the secondary battery protection apparatus according to claim 11; and
the secondary battery.

13. A temperature detection circuit for a secondary battery, comprising:
- a first terminal configured to be electrically connected to a temperature detection terminal of an external device;
- a second terminal to which a temperature sensitive element is configured to be electrically connected, the temperature sensitive element having a characteristic value varying in accordance with a change in temperature of the secondary battery;
- a conversion circuit configured to convert the characteristic value into a voltage corresponding to the change in the temperature of the secondary battery, the conversion circuit being configured to output the voltage; and
- a comparison circuit configured to compare the output voltage of the conversion circuit with a threshold voltage,
- wherein the conversion circuit includes a first switch provided between the first terminal and the second terminal, and includes a second switch provided between the comparison circuit and the second terminal, and
- wherein the first switch and the second switch are configured to be selectively turned on.

* * * * *